United States Patent
Matharan et al.

(10) Patent No.: US 11,973,408 B2
(45) Date of Patent: Apr. 30, 2024

(54) ASSEMBLY FOR DAMPING ACOUSTIC ENERGY, AIR FLOW GENERATOR FOR A COOLING SYSTEM PROVIDED WITH SUCH AN ASSEMBLY, AND ASSOCIATED COOLING SYSTEM

(71) Applicant: Valeo Systemes Thermiques, Le Mesnil-Saint-Denis (FR)

(72) Inventors: Thibaud Matharan, Le Mesnil Saint Denis (FR); Olivier Cheriaux, Le Mesnil Saint Denis (FR); Laurent Brosseron, Le Mesnil Saint Denis (FR); Adil Sbiy, Le Mesnil Saint Denis (FR); Clara Degorce-Dumas, Le Mesnil Saint Denis (FR); Clémence Kwaczewski, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 448 days.

(21) Appl. No.: 17/287,396

(22) PCT Filed: Oct. 16, 2019

(86) PCT No.: PCT/FR2019/052453
§ 371 (c)(1),
(2) Date: Apr. 21, 2021

(87) PCT Pub. No.: WO2020/084224
PCT Pub. Date: Apr. 30, 2020

(65) Prior Publication Data
US 2021/0410339 A1     Dec. 30, 2021

(30) Foreign Application Priority Data
Oct. 23, 2018   (FR) ...................... 1859801

(51) Int. Cl.
*H02K 5/24*       (2006.01)
*H02K 9/22*       (2006.01)

(52) U.S. Cl.
CPC ............... *H02K 9/227* (2021.01); *H02K 5/24* (2013.01)

(58) Field of Classification Search
CPC ............ H02K 5/20; H02K 5/207; H02K 5/24; H02K 9/22; H02K 9/227; H02K 11/30;
(Continued)

(56) References Cited

U.S. PATENT DOCUMENTS

2018/0241290 A1    8/2018  Onishi et al.
2019/0162195 A1*   5/2019  Fukuzawa ........... F04D 29/5813
2021/0104934 A1*   4/2021  Kanda .................... H02K 5/207

FOREIGN PATENT DOCUMENTS

DE     1038642 B     9/1958
DE     20201601 U1   6/2003
(Continued)

OTHER PUBLICATIONS

International Search Report and Written Opinion in corresponding International Application No. PCT/FR2019/052453, dated Dec. 11, 2019 (13 pages).

*Primary Examiner* — Eric Johnson
(74) *Attorney, Agent, or Firm* — Osha Bergman Watanabe & Burton LLP

(57) ABSTRACT

The invention relates to an assembly (10) comprising a vibrating source (20) capable of dissipating vibrational energy (ev); a radiating source (30) capable of generating acoustic waves from the vibrational energy (ev); at least one compressible member (40) which is in contact with the vibrating source (20) and the radiating source (30); the assembly (10) being characterised in that the compressible member (40) is mounted so as to be compressed between the (Continued)

vibrating source (20) and the radiating source (30) in such a way as to dampen the acoustic waves.

9 Claims, 5 Drawing Sheets

(58) Field of Classification Search
CPC .................. H02K 11/33; H02K 1/187; H02K 1/2786–2789; H02K 1/2791; H02K 1/27915; H02K 1/2792; H02K 5/163; H02K 5/1735; H02K 5/1675; H02K 7/085; H02K 9/04; H02K 9/06
See application file for complete search history.

(56) References Cited

FOREIGN PATENT DOCUMENTS

| | | |
|---|---|---|
| DE | 102015116350 A1 | 3/2017 |
| EP | 1320172 A1 | 6/2003 |
| JP | 2018014844 A | 1/2018 |
| KR | 20100009229 U | 9/2010 |
| WO | 0030099 A1 | 5/2000 |
| WO | 2018084427 A1 | 5/2018 |
| WO | WO-2018084427 A1 * 5/2018 ............... B60H 1/12 |

* cited by examiner

ASSEMBLY FOR DAMPING ACOUSTIC ENERGY, AIR FLOW GENERATOR FOR A COOLING SYSTEM PROVIDED WITH SUCH AN ASSEMBLY, AND ASSOCIATED COOLING SYSTEM

FIELD OF THE INVENTION

The invention relates to an assembly for absorbing acoustic energy. The invention also relates to an air flow generator provided with such an assembly. It is more particularly intended for a cooling system for a motor vehicle.

The invention is particularly applicable to any device comprising a brushless electric motor. The invention is also applicable, inter alia, to devices directly driven by the rotary shaft of the electric motor, and to devices driven by means of a gear train.

PRIOR ART

Electric motors conventionally include a motor unit and an electronic control unit for controlling the motor unit. The motor unit comprises a rotor capable of rotating about an axis in order to achieve a predetermined speed of rotation, and a stator. During normal operation, the motor unit generates one or more vibrations or vibrational frequencies to which the electronic control unit is exposed when it is mechanically connected to the motor unit.

A problem arises when the electronic control unit includes parts whose vibration frequency is within the audible range, which is particularly the case with metal components. To be specific, in response to the vibration(s) generated by the motor unit, metal components emit (a) pure tone(s) that is/are unpleasant to the human ear. It has therefore been proposed to acoustically decouple the motor unit and the electronic control unit, thus making it possible to do away with these pure tones.

This solution is certainly effective but is not suitable for all situations. For example, with electric motors, it is undesirable to decouple the motor unit and the control unit because this creates physical discontinuities limiting performance in terms of electromagnetic compatibility (EMC) of the device. In other cases, decoupling cannot be carried out in the area where the pure tone(s) is/are emitted. Indeed, some motors require that the acoustic decoupling be carried out downstream of this area.

The invention overcomes the aforementioned problems and provides for this purpose an assembly comprising:

a vibrating source capable of dissipating vibrational energy,
a radiating source capable of generating sound waves from said vibrational energy,
at least one compressible member which is in contact with said vibrating source and said radiating source, said assembly being characterized in that the compressible member is mounted so as to be compressed between said vibrating source and said radiating source in such a way as to absorb said sound waves.

This provides an assembly in which the vibrating source and the radiating source can be connected, in particular mechanically, while limiting the noise generated by the radiating source. Acoustic emission peaks corresponding to specific frequencies, referred to as pure tones, are converted into emissions of reduced intensity over a wide frequency range. The tones emitted are thus perceived as attenuated and are therefore less annoying for users. To be specific, the compressible member, mounted such that it is compressed between the vibrating source and the radiating source, absorbs the vibrational energy received by the radiating source.

According to various features of the invention which may be considered together or separately:

the vibrating source is rotary;
the vibrating source and the radiating source are mechanically connected;
the vibrating source and the radiating source are rigidly connected;
the compressible member is located in absorption areas;
in said absorption area or areas, the vibrating source is separated from the radiating source by a distance, d, which is less than a length, referred to as the length in the rest state, of the compressible member when said member is in a decompressed configuration;
the absorption area or areas are distributed discretely;
the compressible member is an elastomer, preferably a thermoplastic elastomer;
the compressible member is mounted either on the vibrating source or on the radiating source.

Advantageously, the assembly may be intended to equip an air flow generator for a cooling system for a motor vehicle, said assembly being characterized in that the vibrating source is formed by the whole or part of a motor support means and the radiating source is formed by the whole or part of a heat sink. The vibrations of the heat sink generated by the rotation of the motor, which can give rise to an audible noise, are absorbed by the compressible member.

According to other features, which may be considered together or separately:

the assembly comprises several compressible members extending from a surface of said motor support means facing the heat sink;
the motor support means and/or the heat sink has a substantially circular shape, said compressible members being angularly distributed at regular intervals;
the motor support means comprises said vibrating source, configured to allow attachment of the motor, and a mounting part, configured to be attached to a support means;
said vibrating source and the mounting part are connected by acoustic decoupling means;
said acoustic decoupling means and the compressible members are made of the same material.

The invention also relates to an air flow generator provided with an assembly as described above, said air generator comprising an electric motor unit comprising the vibrating source and an electronic control unit comprising the radiating source. Advantageously, said motor unit and said electronic control unit are located in the extension of one another along a longitudinal axis of the motor unit.

The invention further relates to a cooling system for a motor vehicle comprising an air flow generator as mentioned above.

PRESENTATION OF THE FIGURES

Other objects, features and advantages of the invention will become more clearly apparent from the following description, given with reference to the appended figures, in which:

FIG. 1a schematically shows, in cross section, an assembly according to the prior art;
FIG. 1b schematically shows, in cross section, an assembly according to the invention;

Figure 5A:
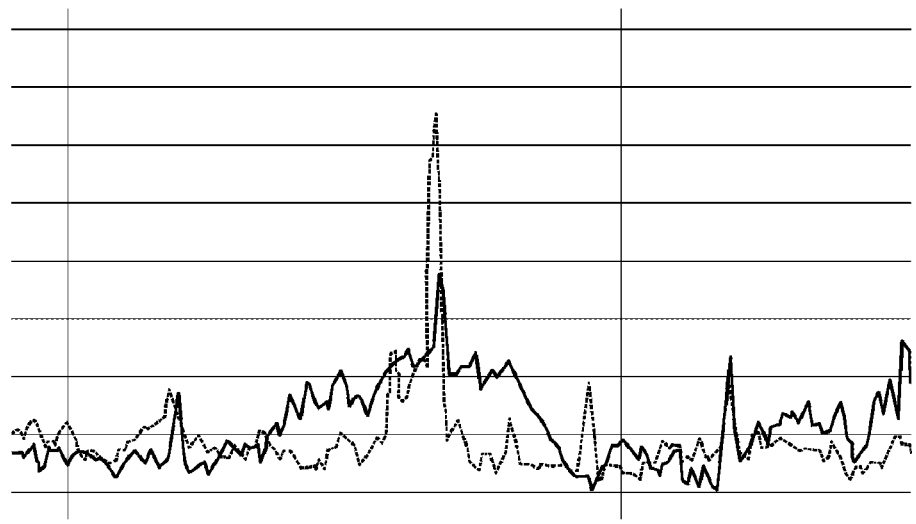
Figure 5B:
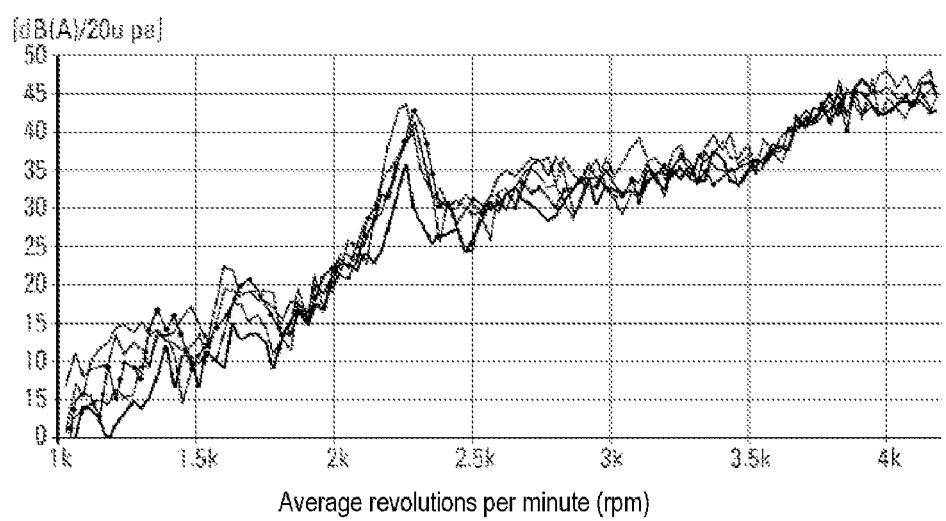

FIG. 5a presents a comparison between two acoustic spectra centered around the frequency 4 kHz: the dark gray spectrum relates to the sound waves generated without the invention and the light gray spectrum relates to the sound waves generated by an assembly according to the invention;

FIG. 5b presents a comparison between five acoustic spectra showing an emission peak associated with the eighth harmonic of the acoustic spectrum associated with an air flow generator comprising a rotary vibrational source rotating at a speed of 2300 RPM (revolutions per minute), the spectrum in the thickest line is associated with the air flow generator provided with the assembly according to the invention.

DETAILED DESCRIPTION

Figure 1A:
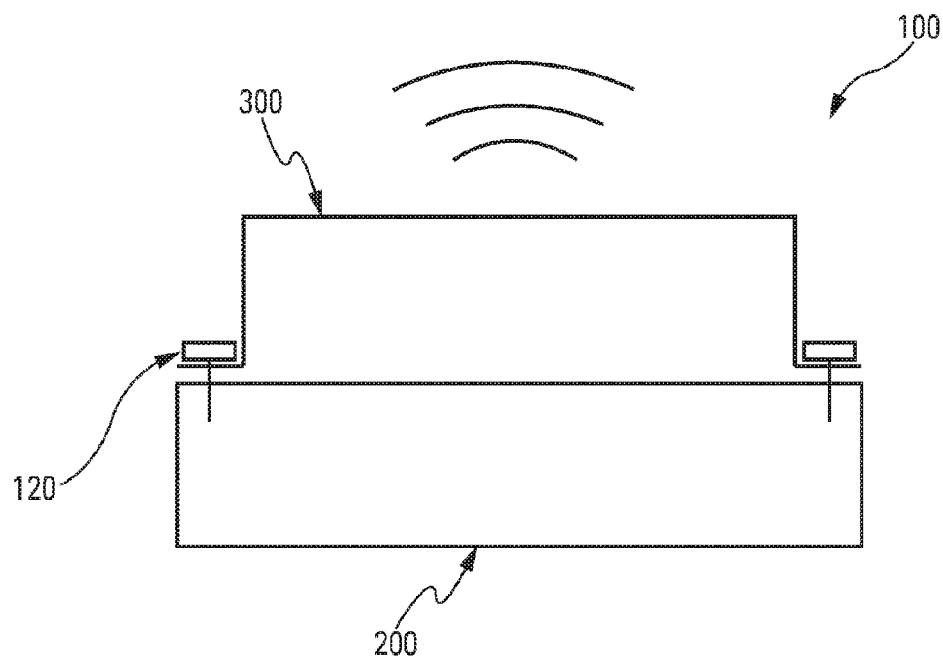

FIG. 1a shows, schematically in a simplified view, an assembly 100 according to the prior art comprising a vibrating source 200 capable of dissipating vibrational energy $e_v$ and a radiating source 300 capable of generating sound waves from said vibrational energy $e_v$. The vibrating source 200 and the radiating source 300 are mechanically connected via attachment means 120. In order to vibrationally decouple the vibrating source 200 and the radiating source 300, it is conventionally proposed to place an acoustic insulation between the two sources, so that it is no longer possible to ensure a rigid mechanical connection between said sources. In some devices, however, a rigid mechanical connection is necessary.

Figure 1B:
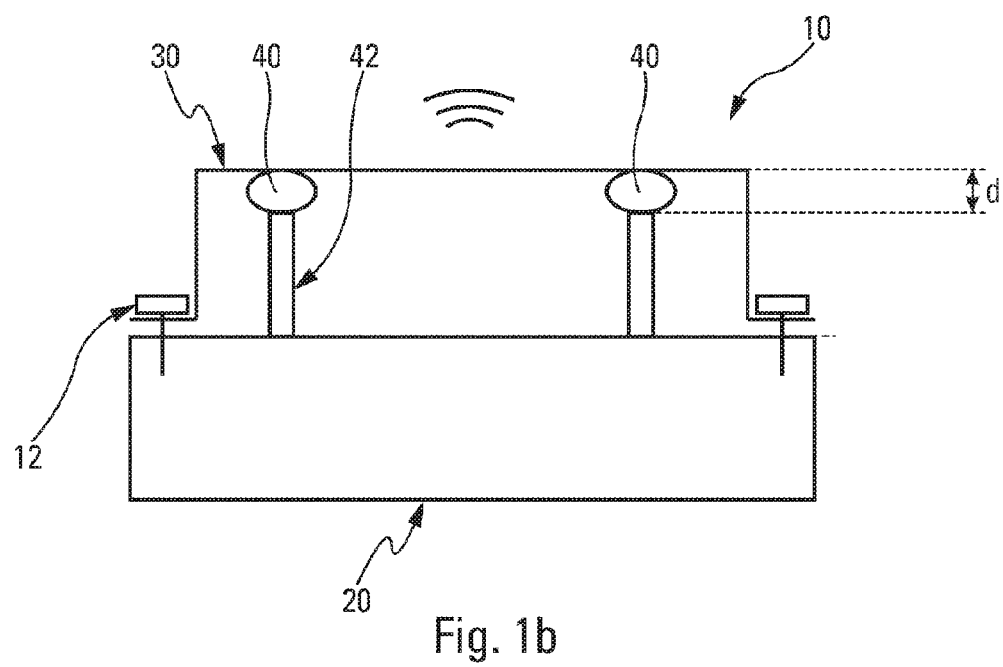

Referring to FIG. 1b, the invention relates to an assembly 10 comprising a vibrating source 20 capable of dissipating vibrational energy $e_v$ and a radiating source 30 capable of generating sound waves from said vibrational energy $e_v$.

The vibrating source 20 can be any part of any device capable of undergoing instantaneous deformations, that is to say capable of vibrating and of dissipating vibrational energy $e_v$, for example under the effect of rotations, shocks produced by objects or other parts, movements, etc. This type of vibrating source is found in particular in mechanical systems comprising rotary mechanisms such as motors, reactors, pumps, turbomachinery, etc. The vibrating source 20 according to the invention is in particular rotary.

The vibrational energy $e_v$ emitted by such a source can propagate, bit by bit, through the elements of the surrounding environment in wave form such that a "vibrational bridge" or "vibrational path" is created between the source of the vibration and the elements of the environment through which said wave passes. The vibrational energy $e_v$ dissipated by the vibrating source 20 can thus propagate from the vibrating source 20 to the radiating source 30, i.e. transferred to said radiating source 30.

As for the radiating source 30, it is any element of the environment capable of generating sound waves from the vibrational energy $e_v$ from the vibrating source. The capacity of the radiating source 30 to generate sound waves from the vibrational energy $e_v$ depends on its sensitivity to the frequency or frequencies of the wave or waves produced from the vibrations.

The intensity with which these sound waves are perceived depends on the structure and on the nature of the material from which the radiating source 30 is made. For example, the sound emitted by a metal plate, for example made of aluminum, subjected to vibration will be perceived more clearly than the sound emitted by a plate made of plastic. To be specific, in one case the vibrational energy $e_v$ is converted to resonance peaks linked to vibration modes in the aluminum, while in the other case said energy $e_v$ will be more easily absorbed in the plastic, which is able to attenuate vibration. However, the intensity with which the sound waves are perceived also depends on the shape of the radiating source, the presence or absence of openings at its ends, its dimensions, etc.

As also shown in FIG. 1b, the assembly according to the invention further comprises at least one compressible member 40 in contact with said vibrating source 20 and said radiating source 30. In other words, the compressible member 40 is connected vibrationally to both the vibrating source 20 and the radiating source 30.

According to the invention, the compressible member 40 is mounted so as to be compressed between said vibrating source 20 and said radiating source 30 so as to absorb the sound waves. Incidentally, the vibrational energy $e_v$ supplied by the vibrating source 20 allows the compressible member 40 to deform by compression/decompression. To be specific, the vibrational energy $e_v$ is stored, in other words absorbed, by the compressible member 40 then converted, at least partially, to potential deformation energy $e_{pd}$ which results in the deformation of the compressible member 40. The vibrational energy $e_v$ is distributed, at the output, between one or more main vibrational frequencies $f_{a,p}$ and secondary vibrational frequencies $f_{a,s}$ such that it is not only attenuated but also spread over a wider frequency range.

Since the compressible member 40 is in contact with the radiating source 30, this vibrational energy $e_v$ is indeed transferred to the radiating source 30 but the sound waves that can be generated by said radiating source 30 are absorbed because the vibrational energy $e_v$ is attenuated and spread in terms of frequency. Once the vibrational energy $e_v$ has been transferred to the radiating source 30, the compressible member 40 then returns to its initial configuration, as does the assembly 10.

The compressible member 40 may advantageously be made of an elastomer, preferably a thermoplastic elastomer, which is elastic and inexpensive.

Advantageously, in the configuration of the invention, the vibrating source 20 and the radiating source 30 may be mechanically connected, even rigidly, without this adversely affecting the proper functioning of the assembly 10 according to the invention. To be specific, the attenuation of the vibrational energy $e_v$ is made possible via the compressible member 40 such that in the presence of said compressible member 40, it is not obligatory to mechanically decouple the vibrating source 20 and the radiating source 30. The assembly 10 can thus include a vibrating source 20 and a radiating source 30 that are mechanically connected.

The compressible member 40 may be mounted either on the vibrating source 20 or on the radiating source 30. In fact, it is not so much the surface from which the compressible member 40 extends that matters in the context of the invention, but the fact that said compressible member 40 is in contact with the vibrating source 20 and the radiating source 30 and mounted so as to be compressed between said sources 20, 30.

Advantageously, the compressible member 40 may be mounted on a support portion 42, either coming from the vibrating source 20 and extending toward the radiating source 30, or coming from the radiating source 30 and extending toward the vibrating source 20. This support portion 42 makes it possible to locally reduce the gap between said sources 20 and 30 depending on the distance separating the vibrating source 20 and the radiating source 30. Preferably, the support portion 42 has a cylindrical shape, which is better suited to the propagation of sound waves. It is not mandatory for the support portion 42 to be made of the same material as the source from which it comes.

Advantageously, the compressible member 40 is located in one or more discrete areas, referred to as absorption areas, and, in said absorption area or areas, the vibrating source 20 is separated from the radiating source 30 by a distance, d, which less than a length, referred to as the length in the rest state, of the compressible member 40 when said member is in a decompressed configuration, before assembly.

In principle, said absorption areas may be distributed in any way. However, their spatial distribution can be determined on the basis of the position of nodes/nodal lines and/or antinodes/antinodal lines of the vibrations existing in the part when the absorption areas are not implemented. Nodes/nodal lines form at defined and fixed locations where vibrations of the same frequency and the same intensity produced by the vibrating source 20 cancel each other out perfectly so that the vibrations disappear. Antinodes/antinodal lines, on the other hand, form at locations, also defined and fixed, where vibrations of the same frequency and the same intensity produced by the vibrating source 20 are added together so that the vibrations are amplified. The position of the antinodal lines depends on the position of the nodal lines.

Advantageously, the absorption areas may therefore be located at antinodes/antinodal lines. The absorption areas may be positioned in two configurations. In a first configuration, the absorption areas may be positioned at an antinode/antinodal line associated with a given frequency. In this case, the sound waves generated by the radiating source 30 from the vibrations produced at this frequency will be significantly absorbed. In a second configuration, the absorption areas may be positioned at multiple antinodes/antinodal lines so as to target multiple given frequencies, or even a range of frequencies. In such a case, all the sound waves generated by the radiating source 30 from the vibrations produced at these frequencies will be absorbed.

Also advantageously, the assembly 10 comprises a number of absorption areas adapted to the intensity of the vibrations. In addition to the possibility of targeting the vibrational frequency or frequencies of interest according to the relative position of the absorption areas with respect to the antinodal lines, it is also possible to adjust the vibrational energy $e_v$ which can be attenuated, and therefore the vibrational amplitude transferred to the radiating source 30. To be specific, it will be understood that the higher the number of absorption areas, the more vibrational energy $e_v$ can be attenuated. In other words, the number of absorption areas helps control the absorption of the sound waves.

For example, in the case of an assembly 10 comprising a rotary vibrating source 20 which rotates at constant speed about its axis of rotation, and from which there extends a compressible member 40 distributed angularly in various absorption areas located around said axis of rotation, the intensity of the vibrations varies as a function of the speed of rotation. The number of absorption areas may be adjusted according to the rotational speed such that the absorption is adapted to the intensity of the vibrations. Some applications may require four or more absorption areas, while others will only require two.

Furthermore, the compressible member 40 may advantageously be cross-shaped. Preferably, in such a configuration, the support portion 42 may also have the shape of a cross. The cross shape of the compressible member 40, and optionally of the support portion 42, has a direct influence on the shape and location of the antinodal and nodal lines. Returning to the example of the assembly 10 comprising a rotary vibrating source 20, considering that the cross comprises a first arm oriented toward the axis of rotation of the vibrating source 20 and a second arm at right angles to said first arm, it is thus possible to target both the radial antinodal lines and the angular antinodal lines. This allows access to a greater number of vibrational frequencies.

Example of an Embodiment of the Invention in the Form of an Air Flow Generator

Figure 2:
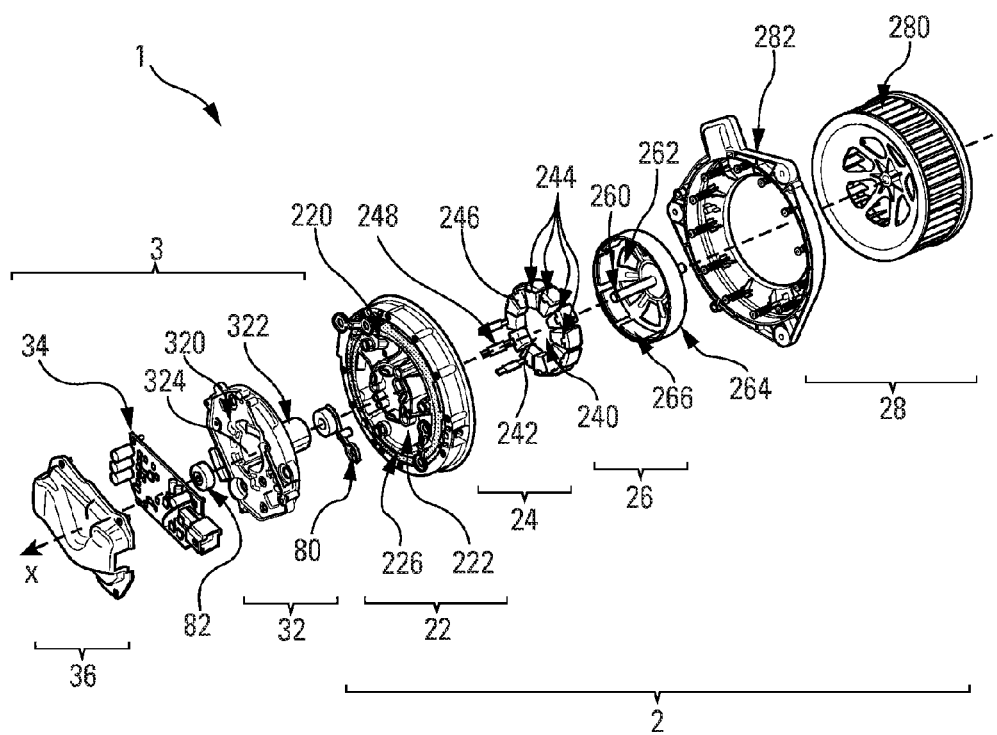
FIG. 2 is an exploded view of an air flow generator according to the prior art.

FIG. 2 shows an air flow generator 1 for sucking in and blowing air. The air flow generator 1 comprises a motor unit 2 and an electronic control unit 3 located in the extension of one another along a main longitudinal axis X (illustrated by a dotted line). The electronic control unit 3 is thus positioned to power the motor unit 2 while limiting the magnetic interference generated by its own internal elements, which will be described further below.

The motor unit 2 consists of a brushless electric motor, also called an electronically commutated electric motor. It is capable of driving a fan wheel 28 in rotation by means of an output shaft 260 of said motor unit 2, extending along said longitudinal axis X.

The motor unit 2 mainly comprises a stator 24 with an excitation winding and a rotor 26 bearing the output shaft 260 capable of driving the fan wheel 28. The stator 24 is secured to a heat sink 32 of the electronic control unit 3, and the rotor 26 is arranged around the stator 24 to be driven in rotation under the effect of magnetic fields generated by the winding and the magnets associated with the rotor.

The stator 24 has a shape with symmetry of revolution about the main longitudinal axis X. The stator 24 comprises a casing having an annular central wall 240 which delimits the contour of an internal bore 242, and the external face of which is extended by a plurality of teeth 244 arranged radially in a star.

The excitation winding is composed of several phases, each comprising at least one wire winding 246, the outputs of which are connected electrically to power supply means not shown here (only the connection means 248 are visible). The stator 24 in this case comprises twelve teeth wound in three-phase. The wire winding is produced around the teeth 244, each tooth bearing a winding element.

The rotor 26 is bell-shaped, with an annular crown ring 264 and a perforated closure wall 262 positioned at an end of said crown ring. The closure wall may have a flat shape substantially at right angles to the axis of the crown ring or a curved shape a clear distance from the crown ring, and it bears, at its center, the output drive shaft 260.

The crown ring 264 has a diameter greater than the external diameter of the stator 24, such that the rotor can cover the stator. The crown ring has an internal face which is turned toward the stator in this covering position, and a plurality of permanent magnets 266 is positioned on this internal face of the crown ring of the rotor.

When the motor unit 2 is assembled, the stator 24 is positioned in the body of the rotor delimited by the crown ring 264. The rotor and the stator are thus arranged so that the permanent magnets 266, borne by the rotor 26, are constantly positioned in the magnetic field generated by the coils of the stator 24 when the latter are supplied with current, so as to generate a rotational movement of the rotor about the stator. Incidentally, the stator 24 and the rotor 26 are arranged such that the closure wall 262 of the rotor is turned toward the fan wheel 28 and the stator is positioned, on the opposite side, facing the heat sink 32.

In addition to its dissipating function, the heat sink 32 fulfills the function of articulation of the drive shaft 260. In this case it also performs the functions of grounding and improving EMC.

To this end, for example, the heat sink 32 comprises a plate 320, of substantially circular shape, and a sleeve 322 positioned projecting from the plate and having an internal channel 324 opening substantially in the center of the plate. The plate 320 extends in a plane substantially at right angles to the axis of revolution of the internal channel in the sleeve. The substantially cylindrical sleeve 322 is suitable for being housed in the internal bore 242 of the stator 24 and for receiving the output drive shaft 260 secured to the rotor 26. Preferably, the plate 320 has a disk shape but it may have other shapes, for example rectangular, square, elliptical, etc.

The heat sink 32 ensures that the rotor 26 is correctly positioned relative to the stator 24. The stator 24 and the heat sink 32 are attached to one another. The stator is positioned around the sleeve 322, in contact with the external face of said sleeve, while the rotor 26 is received, via the output shaft 260 to which it is secured, in the internal channel 324 in the sleeve.

One or more bearings 80, 82 may be inserted in the heat sink 32, in particular in the sleeve 322, to serve as rotation guide for the output shaft 260, which is moreover driven in rotation by the rotor 26. This/these bearing(s) may be (a) ball bearing(s), but it/they may take the form of (a) roller or needle roller bearing(s), or (an)other types of bearing(s).

In other words, the output shaft 260, borne by the rotor 26, is rotatably mounted inside the sleeve 322 of the motor support means via the bearing(s) 80, 82.

The plate 320 and the sleeve 322 form a single piece which contributes to good EMC. Preferentially, the heat sink 32 is made of aluminum, giving this part the combined properties of lightness and good thermal conduction. The heat sink 32 may be electrically grounded.

On the other side to the bearing(s) 80, 82, the fan wheel 28 of the air flow generator 1 is secured to the free end of the output shaft 260 of the motor. It comprises, positioned at its periphery, a plurality of fins 280 and a covering 282. The rotation of the rotor 26 rotationally drives the fan wheel 28 which helps to produce forced air through the fins.

The motor unit 2 is supported by a motor support means 22, which has a substantially circular shape here but this does not have to be the case.

Figure 3:
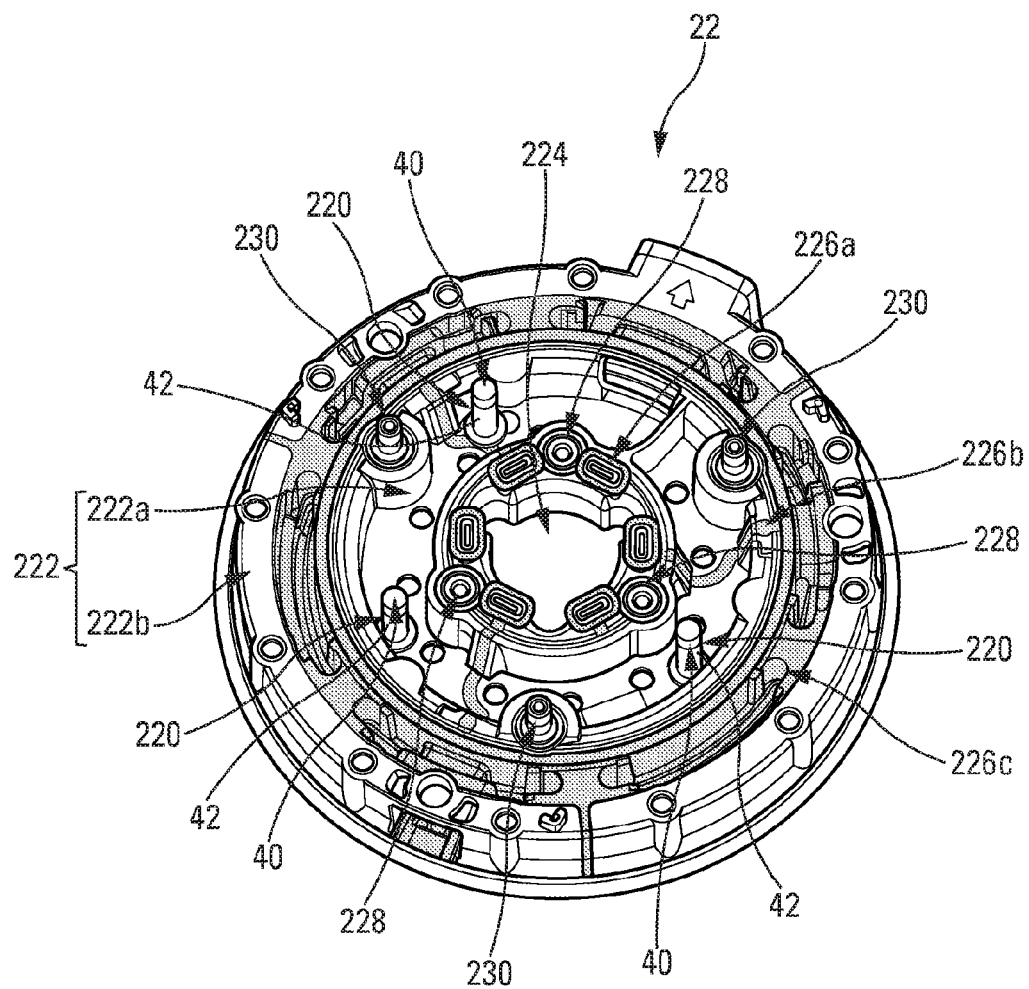
FIG. 3 shows, in perspective, a motor support means for the air flow generator according to the invention.

As can be seen more clearly in FIG. 3, the motor support means 22 includes a mounting part 222 configured to be attached to an HVAC housing. As such, the mounting part 222 has many attachment areas. The mounting part 222 has two portions, a central portion 222a and a peripheral portion 222b, both arranged coaxially with a central orifice 224. The peripheral portion 222b is intended to be attached to an HVAC housing.

The motor support means 22 is mechanically connected to the heat sink 32 in a rigid manner, in particular at the central portion 222a. More precisely, the motor support means 22 and the heat sink 32 are screwed together so that the heat sink 32 is in contact with the motor support means 22, particularly at the screw wells 228. It is in particular pressed, at least partially, against the motor support means 22. This pressing is facilitated by means of positioning studs 230 distributed angularly and/or concentrically at the edge of the central portion 222a. Thus, when the rotor 26 rotates, the attachment areas located on the motor support means 22 are also a source of vibration for the heat sink 32. Vibrational decoupling is therefore necessary.

Advantageously, the motor support means 22 comprises a first, second and third acoustic decoupling means 226a, 226b and 226c. The acoustic decoupling means 226a, 226b and 226c are arranged concentrically and/or radially around the central orifice 224 which makes it possible to reduce the vibrations induced by the motor unit 2 in the attachment areas of the mounting part 222. In this regard, they are preferably made of plastic, and very preferably made of elastomer, for example silicone.

The first acoustic decoupling means 226a comprises elements of generally elliptical shape distributed angularly around the periphery of the central orifice 224 and in contact with the sleeve 322. These elements vibrationally connected to the sleeve 322 induce a first attenuation of the vibrations induced by the motor unit 2. The second acoustic decoupling means 226b is located in grooves formed inside the central portion 222a and forms a decoupling path from the first acoustic decoupling means 226a to the third acoustic decoupling means 226c. The third acoustic decoupling means 226c is annular and positioned coaxially between the central portion 222a and the peripheral portion 222b. It further reduces the vibrations induced by the motor unit 2 in the region of the sleeve 322.

The acoustic decoupling means 226a, 226b and 226c do not absorb the vibrations induced by the motor on the heat sink 32, in particular because the heat sink 32 is made of metal. Other absorbing means are needed. These means are described below.

As regards the electronic control unit 3, it comprises, in addition to the plate 320 and the sleeve 322, an electronic control board 34 and a cover 36. When the electronic control unit 3 is assembled, the electronic board 34, the heat sink 32 and the cover 36 are held secured together by means of through-fastening means (not shown), for example screws. Thus, the electronics contained in the electronic control unit 3 are advantageously close to said motor unit 2.

The cover 36 is hollow and represents the outer casing of the electronic control unit 3. It participates in heat dissipation. The cover 36 includes an appropriate interior volume allowing it to accommodate the electronic control board 34 by following the contours of said electronic board 34. Thus, when the electronic control unit 3 is assembled, the electronic board 34 is fully integrated into the interior volume and is thus protected from the external environment. In this case, the cover 36 is the part most likely to generate sound waves.

The electronic control board 34 comprises one or more control elements and/or connectors to external circuits. It is intended to supply power to the motor unit 2. The control elements give off heat which must be dissipated less it damage the electronic control board 34. Conventionally, the electronic board requires limited operating temperatures, for example 120 or 150° C.

In this regard, the electronic board 34 may be thermally coupled to the heat sink 32, which is in this case made of metal, by means of a thermal paste making it possible to effectively cool said electronic board 34 by thermal conduction. The heat sink 32 integrates several functions, including the cooling of the components of said electronic board 34 and the support of the electronic control unit 3.

The plate 320 of the heat sink 32 forms a housing intended to accommodate the electronic control board 34. The housing has a shape, in this case rectangular, following the contours of the electronic board 34. The internal surface of the housing 320 is generally flat. It nevertheless includes some recesses adapted to the elements passing through said electronic board 34 and allowing close contact between the electronic board 34 and said housing 320.

Preferably, the heat sink 32 may be directly connected to the ground of the electronic board 34 and this, combined with the fact that it is made of metal, makes it possible to block electromagnetic radiation emitted by the electronic board, as this radiation could interfere with the operation of the motor unit 2.

That being so, everything is done to keep the control electronics close to the rotor 26 and the stator 24, on the one hand for the purposes of powering the stator, and on the other hand in order to avoid electromagnetic decoupling of the motor unit 2 and the electronic control unit 3 for the reasons mentioned above. Incidentally, since the motor support means 22 and the heat sink 32 are located at the interface between the two units 2, 3, it is not possible to decouple them acoustically.

When the air flow generator 1 is in operation, the motor support means 22 generates vibrations induced by the rotation of the rotor 26 at its central orifice 224 which receives the sleeve 322, itself connected to the rotor by the bearing(s) 80, 82. Since the heat sink 32 and the motor support means 22 are in contact, the electronic control unit 3 is exposed to the vibrations induced by the motor unit 2.

Therein, the motor support means 22 constitutes a vibrating source 20 in particular capable of dissipating vibrational energy $e_v$, while the heat sink 32, being made of metal, consists of a radiating source 30 capable of generating sound waves from said vibrational energy $e_v$.

According to a first variant of this exemplary embodiment of the invention shown in FIG. 3, the compressible members 40, in the form of pads, are connected to the motor support means 22. Once the air flow generator 1 is assembled, these compressible members 40 are also in contact with the heat sink 32.

According to the example shown, the compressible members 40 are positioned on cylindrical portions 220, referred to as "studs", coming from the motor support means 22. As shown in FIG. 3, these studs 220 extend axially from the central portion 222a parallel to the main longitudinal axis X. Furthermore, they are sufficiently raised to locally reduce the gap between the motor support means 22 and the heat sink 32. Their length may even be greater than the gap between the motor support means 22 and the heat sink 32. To be specific, as can be seen in FIG. 3, the central portion 222a has cavities which create gaps locally between the motor support means 22 and the heat sink 32, in particular the plate 320.

The compressible members 40 are angularly distributed, at regular intervals, from the central portion 222a (which as a reminder is located facing the heat sink 32) and constitute absorption areas. This configuration is particularly suited to concentric propagation of the vibrational waves created by the motor unit 2 from the central orifice 224 of the motor support means. Moreover, the antinodal/nodal lines associated with these vibrations also propagate concentrically so that the angular distribution of said compressible members 40 makes it possible to target them one by one.

In this case, the compressible members 40 and the studs 220 are located at the same distance from the main longitudinal axis X, and therefore the axis of the heat sink 32. In the embodiment shown, it will be understood that only a given vibrational frequency is targeted and that only the sound waves generated by the heat sink 32 from the vibrations produced at this frequency will be absorbed. The compressible members 40 and the studs 220 may be located at different distances from the main longitudinal axis X. In this case, several vibrational frequencies are targeted, all the sound waves generated by the heat sink 32 from the vibrations produced at these frequencies will be absorbed.

In a particularly advantageous manner, the compressible members 40 (and the absorption areas) are three in number, which allows appropriate absorption of the sound waves given the fact that the heat sink 32 is made of metal and the intensity of the vibrations generated by the motor unit 2, knowing that the latter performs approximately 2300 revolutions/minute on average in normal operation. This number of compressible members 40 is not limiting and must be adapted to the characteristics of the motor unit 2.

The compressible members 40 are mounted so as to be compressed between said motor support means 22 and said heat sink 32 so as to absorb the sound waves that may be generated by the heat sink 32. In this regard, they are preferably made of thermoplastic elastomer. The compressible members 40 are thus vibrationally connected both to the motor support means 22 and to the heat sink 32.

Thus, as the rotor 26 rotates around the stator 24, because the compressible members 40 are in contact with the heat sink 32, the vibrational energy $e_v$ dissipated by the motor support means 22 is attenuated and spread then transferred to the heat sink 32 in such a way that the sound waves that may be generated by said heat sink 32 are absorbed.

Advantageously, the compressible members 40 are cross-shaped. Preferably, so too are the studs 220. The cross shape of the compressible members 40 and of the support portion 42 makes it possible to target both the radial antinodal lines and the angular antinodal lines. This allows access to a greater number of vibrational frequencies.

Figure 4:
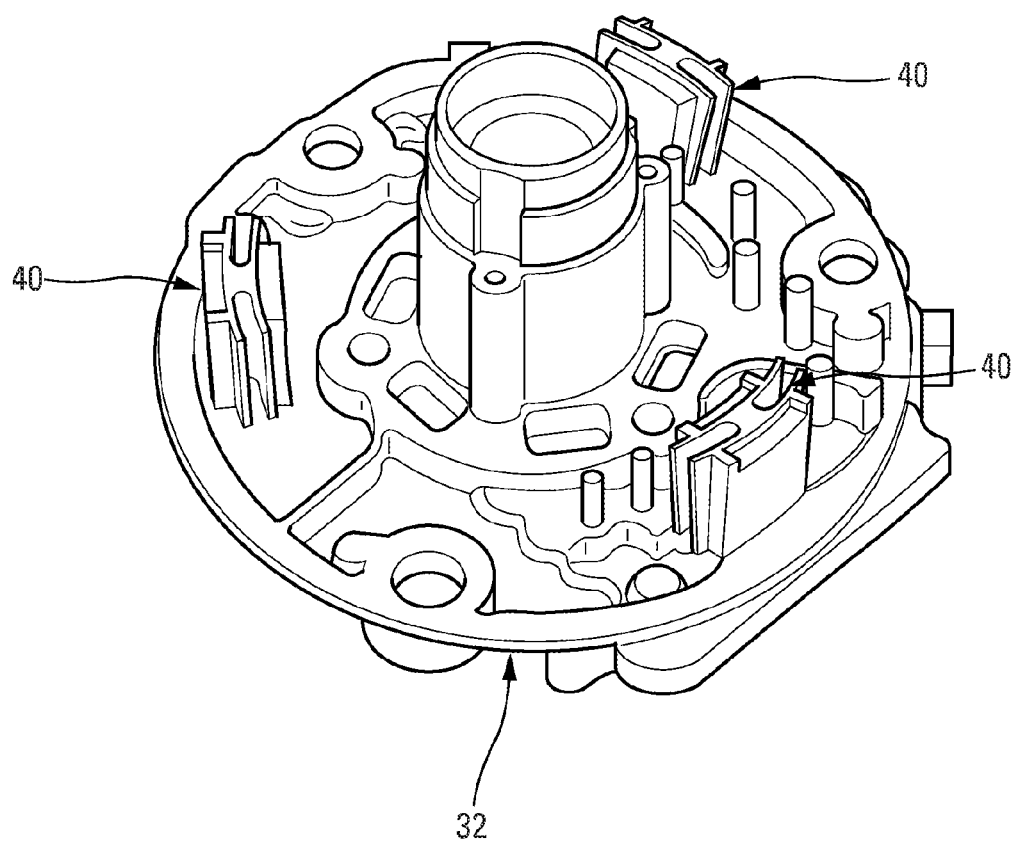
FIG. 4 shows, in perspective, in an alternative embodiment, a heat sink of an air flow generator according to the invention.

According to a second variant of this exemplary embodiment of the invention shown in FIG. 4, the compressible members 40 extend from the heat sink 32.

In this variant, the compressible members 40 extend parallel to the main longitudinal axis X from cavities present on a face of the heat sink oriented facing the motor support means 22. They extend more precisely from recesses (adapted to the elements passing through said electronic board 34) made in the heat sink 32. In addition, they are sufficiently raised so that, once the air flow generator 1 is assembled, they are in contact with the motor support means 22, without any additional means (in particular without a stud).

As in the case of the first variant, the compressible members 40 are distributed angularly at regular intervals from the heat sink 32 and constitute absorption areas.

The compressible members are each in the form of two angular cylinder sectors which follow the periphery of the recesses made in the heat sink 32 and which are connected by a portion of thin material extending substantially in a middle area of said sectors.

In this configuration, although the compressible members 40 are located at the same distance from the main longitudinal axis X, because the two sectors are located in different radial positions, at least two different vibrational frequencies can be targeted. Thus, it is clear that even by virtue of their shape, the compressible members 40 can influence the number of frequencies at which the sound waves can be absorbed.

Also in this case, the compressible members 40 are mounted so as to be compressed between said motor support means 22 and said heat sink 32 so as to absorb the sound waves that may be generated by the heat sink 32.

In a particularly advantageous manner, the compressible members 40 are three in number, which allows appropriate absorption of the sound waves of the motor unit 2. They are preferably made of the same material as the decoupling means, in particular an elastomer, for example silicone.

With reference to FIG. 5a, this shows a comparison of two acoustic spectra centered around the frequency 4 kHz.

The spectrum in dark gray relates to the sound waves generated by a motor support means 22 and a heat sink 32 of an air flow generator not according to the invention, while the spectrum in light gray is associated with the sound waves generated by an assembly 1 according to the example shown in FIG. 3 of the invention.

The aluminum heat sink 32 emits sound waves according to an acoustic spectrum $S_a$ for which the main emission peak is located at a main frequency $f_{a,p}$ substantially centered on 4 kHz.

It can clearly be seen that the sound waves generated by the assembly 1 according to the invention are absorbed, since at this frequency the emission peak is itself absorbed, i.e. attenuated and spread over a wider frequency range. In operation, an air flow generator 1 provided with such an assembly induces much less noise pollution than would be caused by the pure tones emitted in the absence of said assembly.

FIG. 5b shows a comparison between five acoustic spectra having an emission peak associated with the eighth harmonic of the acoustic spectrum of FIG. 5a.

Note that the emission peak associated with this eighth harmonic, belonging to the frequencies $f_{a,s}$ referred to as secondary frequencies, is also absorbed.

In this particular exemplary embodiment, note that the radiating source 30 is capable of vibrating when connected to a vibrating source other than the vibrating source 20 bearing/in contact with the compressible member. Likewise, the vibrating source 20 may itself be subjected to vibrations generated by the radiating source 30. Regardless of what causes either one to vibrate, insertion relies on the use of a vibrating element, at the vibrating source 20, to absorb the vibrations of a source of noise, namely the radiating source 30, by inserting a compressible member between the two.

The invention claimed is:

1. An assembly comprising:
a vibrating source capable of dissipating vibrational energy;
a radiating source capable of generating sound waves from said vibrational energy;
at least one compressible member which is in contact with said vibrating source and said radiating source,
wherein the compressible member is mounted so as to be compressed between said vibrating source and said radiating source so as to absorb said sound wave,
wherein the assembly is configured to equip an air flow generator for a cooling system for a motor vehicle,
wherein the vibrating source is formed by the whole or part of a motor support means and the radiating source is formed by the whole or part of a heat sink;
the heat sink including a plate and a sleeve that projects from the plate; and
the sleeve including an internal channel that receives an output shaft of a rotor of a motor supported by the motor support means.

2. The assembly as claimed in claim 1, wherein the vibrating source is rotary.

3. The assembly as claimed in claim 1, wherein the vibrating source and the radiating source are rigidly mechanically connected.

4. The assembly as claimed in claim 1, wherein the compressible member is located in one or various areas distributed discretely, referred to as absorption areas, and, in said absorption area or areas, the vibrating source is separated from the radiating source by a distance, d, which is less than a length, referred to as the length in the rest state, of the compressible member when said member is in a decompressed configuration.

5. The assembly as claimed in claim 1, wherein the compressible member is an elastomer.

6. The assembly as claimed in claim 1, wherein the compressible member is mounted either on the vibrating source or on the radiating source.

7. The assembly as claimed in claim 1, comprising several compressible members extending from a surface of said motor support means facing the heat sink.

8. The assembly as claimed in claim 7, wherein the motor support means comprises said vibrating source, configured to allow attachment of the motor, and a mounting part, configured to be attached to a support means, said vibrating source and the mounting part being connected by acoustic decoupling means, said acoustic decoupling means and the compressible members being made of the same material.

9. An air flow generator 1 for a cooling system for a motor vehicle, provided with an assembly, the assembly comprising,
a vibrating source capable of dissipating vibrational energy;
a radiating source capable of generating sound waves from said vibrational energy;
at least one compressible member 40 which is in contact with said vibrating source and said radiating source,
wherein the compressible member is mounted so as to be compressed between said vibrating source and said radiating source so as to absorb said sound waves,
said air flow generator comprising:
an electric motor unit 2 comprising the vibrating source; and
an electronic control unit 3 comprising the radiating source,
wherein the vibrating source is formed by the whole or part of a motor support means 22 and the radiating source is formed by the whole or part of a heat sink 32;
the heat sink including a plate 320 and a sleeve 322 that projects from the plate;
the sleeve including an internal channel 324 that receives an output shaft 260 of a rotor 26 of the electric motor unit.

* * * * *